(12) United States Patent
Kulkarni et al.

(10) Patent No.: US 6,797,351 B2
(45) Date of Patent: Sep. 28, 2004

(54) STEREOLITHOGRAPHIC SUPPORTS

(75) Inventors: Rajeev B. Kulkarni, Valencia, CA (US); Chris R. Manners, Moorpark, CA (US)

(73) Assignee: 3D Systems, Inc., Valencia, CA (US)

( * ) Notice: Subject to any disclaimer, the term of this patent is extended or adjusted under 35 U.S.C. 154(b) by 1 day.

(21) Appl. No.: 10/410,073

(22) Filed: Apr. 9, 2003

(65) Prior Publication Data

US 2003/0178750 A1 Sep. 25, 2003

Related U.S. Application Data

(62) Division of application No. 09/493,938, filed on Jan. 28, 2000, now Pat. No. 6,558,606.

(51) Int. Cl.[7] .................................................. B32B 3/02
(52) U.S. Cl. .......................................................... 428/43
(58) Field of Search ........................... 428/43; 425/174, 425/174.4, 447

(56) References Cited

U.S. PATENT DOCUMENTS

| | | |
|---|---|---|
| 4,575,330 A | 3/1986 | Hull |
| 4,999,143 A | 3/1991 | Hull et al. |
| 5,260,009 A | 11/1993 | Penn |
| 5,362,427 A | 11/1994 | Mitchell, Jr. |
| 5,501,824 A | 3/1996 | Almquist |
| 5,503,785 A | 4/1996 | Crump et al. |
| 5,569,431 A | 10/1996 | Hull |
| 5,595,703 A | 1/1997 | Swaelens et al. |
| 5,672,312 A | 9/1997 | Almquist et al. |
| 5,676,904 A | 10/1997 | Almquist et al. |
| 5,897,825 A | 4/1999 | Fruth et al. |
| 5,943,235 A | 8/1999 | Earl et al. |
| 6,193,923 B1 | 2/2001 | Leyden et al. |
| 6,558,606 B1 * | 5/2003 | Kulkarni et al. ............ 264/401 |

FOREIGN PATENT DOCUMENTS

| | | |
|---|---|---|
| EP | 0 338 751 A2 | 10/1989 |
| EP | 362 982 | 4/1990 |
| EP | 0 590 957 A1 | 4/1994 |
| EP | 655 317 A1 | 5/1995 |

* cited by examiner

Primary Examiner—Alexander S. Thomas
(74) Attorney, Agent, or Firm—Ralph D'Alessandro

(57) ABSTRACT

An improved stereolithographic process for forming three-dimensional objects using an improved support structure and the improved support structure is described. The support structure is formed by using differential curing of the liquid media material to form solid supports with weak points at selected locations to facilitate support removal from a three-dimensional object and minimize post-processing.

11 Claims, 6 Drawing Sheets

STEREOLITHOGRAPHIC SUPPORTS

This application is a division of application Ser. No. 09/493,938, now U.S. Pat. No. 6,558,606, filed Jan. 28, 2000.

FIELD OF INVENTION

The present invention is directed to methods for forming three-dimensional objects on a layer-by-layer basis and, more particularly, is directed to a method of creating supports for stereolithographic objects by using an improved method of curing the photopolymer liquid from which the three-dimensional build object is generated.

BACKGROUND OF THE INVENTION

In recent years, many different techniques for the fast production of three-dimensional models have been developed for industrial use. These are sometimes referred to as rapid prototyping and manufacturing ("RP&M") techniques. In general, rapid prototyping and manufacturing techniques build three-dimensional objects layer by layer from a working medium utilizing a sliced data set representing cross-sections of the object to be formed. Typically, an object representation is initially provided by a Computer Aided Design (CAD) system.

Stereolithography, presently the most common RP&M technique, may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) using a computer controlled laser beam of ultraviolet light (UV) light into successive laminae according to the two-dimensional layer data. During transformation, the successive laminae are bonded to previously formed laminae to allow integral formation of the three-dimensional object.

Stereolithography represents an unprecedented way to quickly make complex or simple parts without tooling. Since this technology depends on using a computer to generate its cross-sectional patterns, there is a natural data link to CAD/CAM. However, such systems have encountered difficulties relating to shrinkage, curl and other distortions, as well as resolution, accuracy, and difficulties in producing certain object shapes.

Although stereolithography has shown itself to be an effective technique for forming three-dimensional objects, various improvements addressing the technology's difficulties have been desired for some time. Many improvements have addressed the aforementioned difficulties and have been made to object accuracy, speed and appearance of the build object over the years. However, there still remains a need for further improving the build object appearance and ease of making certain object shapes. Various aspects of the stereolithographic building process can impact the build object appearance and ease of generation of the three-dimensional object. For instance, one aspect and area for needed improvement is with build object supports.

The fabrication of supports is the first step in the stereolithographic build process since the build object initially must be supported on the elevator platform in the vat of photopolymer of the stereolithographic systems. Supports are required for a plurality of reasons. The supports act like fixtures in conventional machining and hold the build object or part in place during the build process. Supports also provide a means of securing isolated segments or islands that would otherwise float away and they are used to restrain certain geometries that would likely experience distortion, such as curl, during laser curing of the photopolymer liquid. Support structure must be removed from the build object in a manual and labor-intensive post-processing step. Supports are shown in the figures in U.S. Pat. No. 4,575,330. The supports shown in this patent attach the object to the platform.

The original type of posts or supports used were actually formed by curing single points. These points were cured for specific lengths of time to give appropriate cure depths, with a corresponding cure width. This type of post is limited by its strength and the associated cure time required to achieve this strength level, if it is possible to obtain the desired strength at all.

Another type of post or support structure is based on the need to increase the adhesion strength between layers. The adhesion strength is proportional to the area of contact between layers. When curing a point, the cure width quickly reaches a limit where additional cure width is unpractical. Therefore, another method of increasing contact area was implemented. Instead of curing supports that are point vectors in cross-section, this new method uses supports that are polygons in cross-section. These polygons can be triangles, rectangles, octagons, etc. These structures give much greater contact area between layers and much greater adhesion strength, along with much greater structural strength against horizontal translation. These supports work reasonably well, but they still present difficulties because: (1) they are hard to remove from the object; (2) they support only a limited number of object vectors; and (3) they require the use of a base to support the polygons to insure attachment to the perforated build platform.

Ease of removal of the support structure is especially critical as it affects both speed of the build process and appearance of the final build object. Supports traditionally have been difficult to remove once the support material has been cured to support the object, either on the build platform or to support a hollow structure within the build object. Removal of supports that leave marred up-facing or down-facing surfaces on the build object detract from the appearance of the build object and the utility of the stereolithographic process.

One form of three-dimensional object modeling that addresses the issue of support removal is the fused deposition modeling technique. U.S. Pat. No. 5,503,785 discusses the need to remove support structure with minimal effort so as to obtain quick and easy removal. This patent disclosed a method of using a first material to build the modeling object in the support structure, and a second release material that is formed of a different composition than the material for the object and the support structure. The second release material is deposited in the space between the build object and the support structure and is selected so that it forms a weak, breakable bond with the first material in a readily separable joint along the object, support structure interface. The disadvantage to this approach, however, is that the apparatus and method requires a pair of dispensers, each having its own discharge tip for different material and material reservoirs for the build object/support structure material and the release layer material. This approach unnecessarily adds to the complexity of the apparatus.

These problems are solved in the method and support structure of the present invention.

SUMMARY OF THE INVENTION

It is an aspect of the present invention that a smoother surfaced build object or part is obtained that requires decreased processing because of the ease of removal of the support structure from the build object due to the use of a method of curing the photopolymer liquid to form the build object that employs differential curing of both the build object and the support structure.

It is another aspect of the present invention that differential curing of the support structure at the up-facing and down-facing surfaces where the supports intersect the part makes removal of the supports easier, less time consuming, and less detrimental to the appearance of the finished build object or part.

It is a feature of the present invention that less curing of the support structure occurs at the up-facing and down-facing surfaces to create weak points at the build object or part support boundary to permit the supports to easily be broken away.

It is another feature of the present invention that the stereolithographic build method identifies the geometric polygons support that actually touch the build object.

It is yet another feature of the present invention that the support structure has less contact surface area with the build object than prior support structure.

It is still another feature of the present invention that different cure depths of the photopolymer material forming the build object are employed for different boundaries of the build object.

It is an advantage of the present invention that the initial preparation is faster due to employing more automation and less user analysis of the supports to be built.

It is another advantage of the present invention that better build object support is provided that leads to higher yields from the use of the stereolithographic process and apparatus since the build object can be over supported, resulting in less failures due to lack of support.

It is still another advantage of the present invention that the method involves less post-processing of the build object since it is easier to remove the support structure that contacts both the support platform or elevator and the build object.

It is yet another advantage of the present invention that the build object has better appearance because there is less interface or contact surface with the support structure.

It is yet another advantage of the present invention that the weak points at the interface between the support structure and the build object make it easier to remove the support structure.

It is still a further advantage of the present invention that the support structure does not retain trapped resin between the supports in the part being built.

It is still another advantage of the present invention that very delicately featured parts may be constructed because the support structure may be removed without harming the part.

These and other aspects, features, and advantages are obtained by the present invention through the use of a method of differential curing of the support structure that interfaces between up- and down-facing surfaces and the build object to create a faster generated, better appearing final part that requires less post-processing.

BRIEF DESCRIPTION OF THE DRAWING

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Stereolithography parts are preferably built on structures known as supports, rather than directly on the elevator platform which moves the build object or part up and down as successive layers or laminae are formed in the photocuring processing. One reason for using supports is to separate the part from the platform. A part cured directly to the platform would be difficult to remove, especially if the adhering surface is large. Furthermore, the thickness of the first layer formed on the platform cannot be accurately controlled and may even vary if the platform is warped or improperly installed. This could result in lines which are not cured deeply enough to adhere to the platform, a condition that could promote curl. Even without these potential problems, the holes in the platform would create matching bumps on the bottom surface of any part made directly on it. Displacement of liquid as the elevator platform is submerged in a dip mode of part recoating can change the thickness of the first few layers, and these effects would be undesirable within the part itself.

Another reason for using supports is to improve liquid flow around the part. This enables use of a shorter dip or recoating time, since the surface of the liquid will settle faster with improved flow. Additionally, excess resin will drain faster from the completed part to reduce post-processing time.

Supports are also used to anchor sections of a part which would otherwise have a tendency to move and to strengthen areas susceptible to curl or damage during part generation. Support structure is required to build hollow parts or parts with unsupported overhang.

Figure 1:
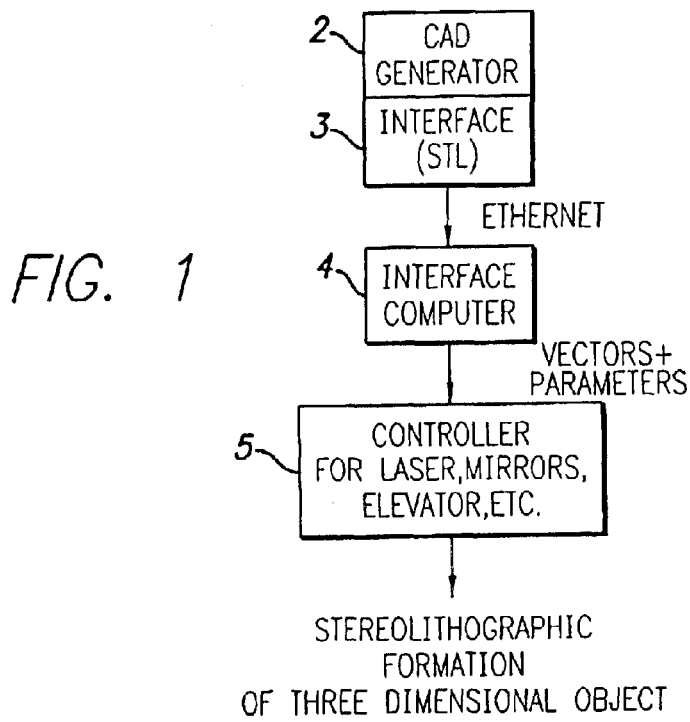
FIG. 1 is an overall block diagram of a stereolithography system for the practice of the present invention.

Referring now to the drawings, and particularly to FIG. 1, there is shown a block diagram of an overall stereolithography system suitable for practicing the present invention. A CAD generator 2 and appropriate interface 3 provide a data description of the object to be formed, typically in STL file format, via network communication such as ETHERNET or the like to an interface computer 4 where the object data is manipulated to optimize the data and provide output vectors. The STL file is a tessellated object description consisting of the X, Y, and Z coordinates of the three vertices of each surface polygon, as well as an index that describes the orientation of the surface normal. The surface polygons preferably are triangles. The manipulated data will reduce stress, curl and distortion, and increase resolution, strength, accuracy, speed and economy of reproduction, even for rather difficult and complex object shapes. The interface computer 4 generates layer data by slicing, varying layer thickness, rounding polygon vertices, filling, scaling, cross-hatching, offsetting vectors, ordering of vectors, and generating flat skins, near-flat skins, up-facing and down-facing skins.

The vector data and parameters from the computer 4 are directed to a controller subsystem 5 for operating the system stereolithographic laser, mirrors, elevator and the like which permit the solid individual laminae that represent cross-sections of the build object or part to be generated and the laminae to be successfully combined to form the three-dimensional part. The part is generated by the application of an appropriate form of energy stimulation as a graphic pattern according to these vector data and parameters at the fluid medium surface to form the thin individual layers or laminae. Each solid layer or individual lamina represents an adjacent cross-section of the three-dimensional object to be produced. Successive adjacent layers or laminae are superimposed as they are formed to generate the three-dimensional object or part.

Figure 9:
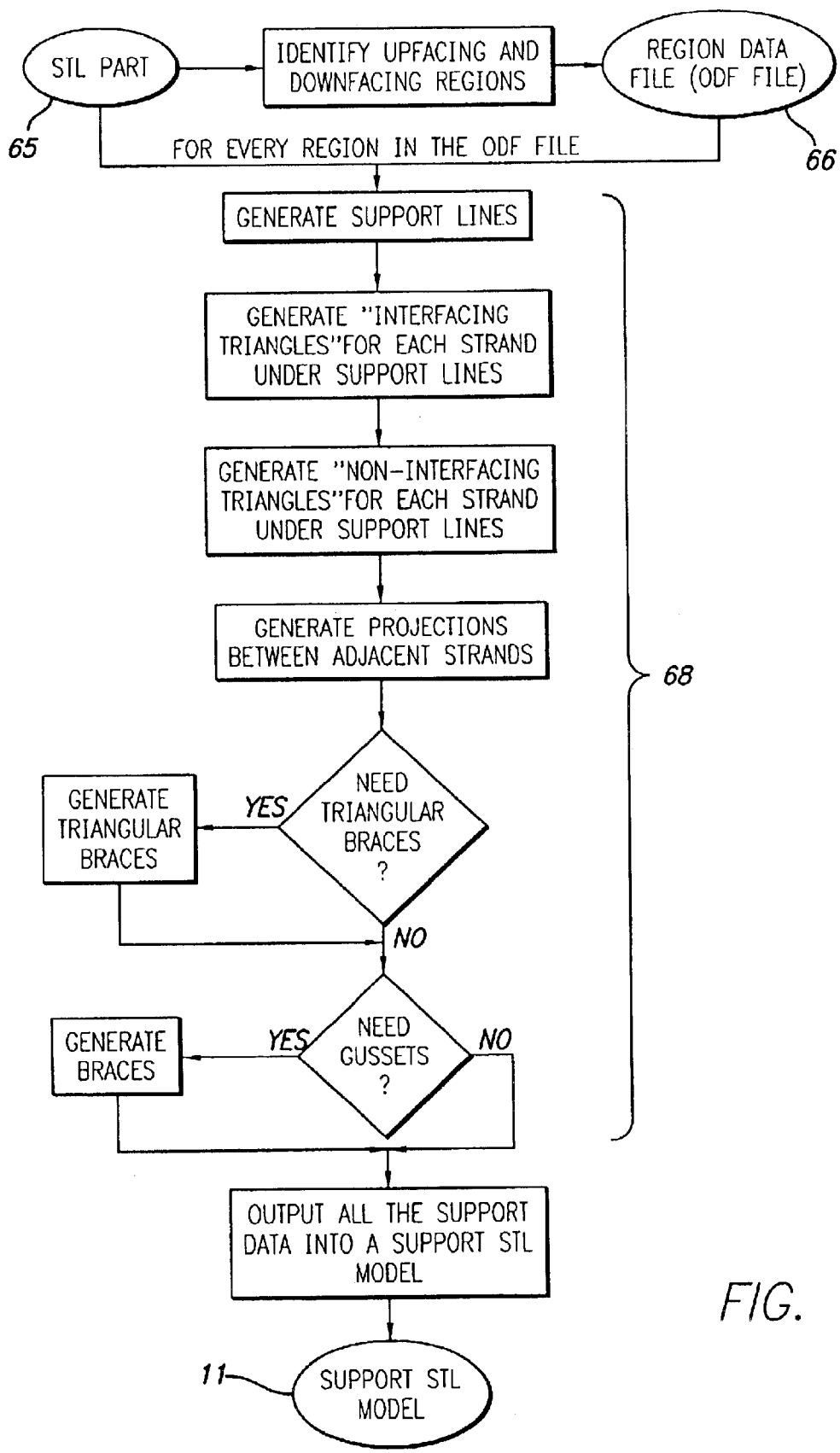
FIG. 9 is a process flow diagram showing the steps used by a stereolithography system to create the improved support structure of the present invention.

FIG. 9 shows the process and steps used in a stereolithography system to create the improved support structure of the present invention. The software generates the tessellated object description in the STL file 65. The algorithm considers all of the triangles of the STL file and identifies all down-facing triangles by analyzing the normal of the triangle. This is accomplished by comparing the angle of the normal with the support angle specified by the user and then all triangles are placed in one set. The same procedure is repeated to identify the up-facing triangles of the STL build object or part 11. In this instance there is no threshold angle with which the normals are compared. All of the triangles that have normals in the positive upward direction are considered as up-facing triangles and these triangles are then collected and placed in a second set. The first set of down-facing triangles is analyzed and all of the different neighboring triangles are collected into different regions. The outer edges of all of the neighboring triangles form a down-facing region. Several of these regions are created and stored in the overhang data file (ODF) 66. This step is repeated for the up-facing triangle set and all of the up-facing regions are generated. These up-facing regions are also stored in the ODF file 66. The key parameters for the part 11, as will be explained hereafter, are also stored in the ODF file 66 on an individual region basis. The supports algorithm or support generator 68 then uses the data in the ODF file 66 to generate the support structure 10.

A separate software module generates the support lines and hatch lines in the stereolithographic part 11 by constructing the supports under the down-facing regions that have been identified previously. Data is inputted to this module in the software from the Compressed Triangle List (CTL) file and the ODF file 66. The output from this module is the support STL file. This is accomplished by opening the ODF file 66 and reading in the regions data, then considering each down-facing region and generating the support lines and hatch lines. For each region, strands and projections are generated and, if required, triangular braces are added to the support structure. The triangulation data generated for the strands and projections, and if required, the triangular braces, is stored in the supports STL file. When the ODF file 66 is opened and all the region data is stored in an internal region data-structure. This data is used subsequently to perform the required steps.

Then each down-facing region is considered and support lines and hatch lines are generated. The support lines are generated exactly under the perimeter of the region and then two sets of hatch lines are generated. One set is parallel to the X-axis and the other is parallel to the Y-axis. The distance between the two parallel hatch lines is equal to a value specified for the Line Spacing parameter. Hatch lines are always generated parallel to the X- and Y-axes. Initially the hatch lines parallel to the X-axis are generated so that the distance between two parallel consecutive hatch lines is equal to the Line Spacing. Each hatch line is then trimmed at the point where it intersects the support lines for that region. Additional vertices are introduced in between the end points of each line such that the distance between consecutive vertices is equal to the Strand Spacing. The hatch lines parallel to the X-axis are generated and the hatch lines parallel to the Y-axis are then generated.

It should be noted that when generating the support lines, the original vertices that defined the perimeter of the region are used to give the basic support lines. Additional vertices are introduced in between the original vertices so that the distance between consecutive vertices is equal to what is known as the Strand Spacing parameter. However, if the original vertices are less than the Strand Spacing, then no vertices are introduced between the original vertices.

A filtering process in the algorithm is employed at this point for STL models or parts 11 that are finely tessellated and the triangle size is very small. This small triangle size will result in down-facing perimeters that have vertices that are very close to each other and, later in the process, such very close vertices will result in adjacent strands sticking making support removal will be difficult. Hence, the algorithm filters out vertices of the support lines and the hatch lines that are very closes to each other, for example, those that are less than 0.050 inches apart.

The next step in the process is to generate the actual strands and projections for each region. The support generator 68 considers each support line of a region, generates a strand under each vertex of the support line, divides the line in the Z-direction into several equi-distance vertices, the distance between each vertex being equal to the Projection Offset Height parameter, and projections from each of the vertices to the next adjacent strand are generated. This process is repeated for each strand of the support line and the entire process is repeated for each hatch line of the region.

Figure 10:
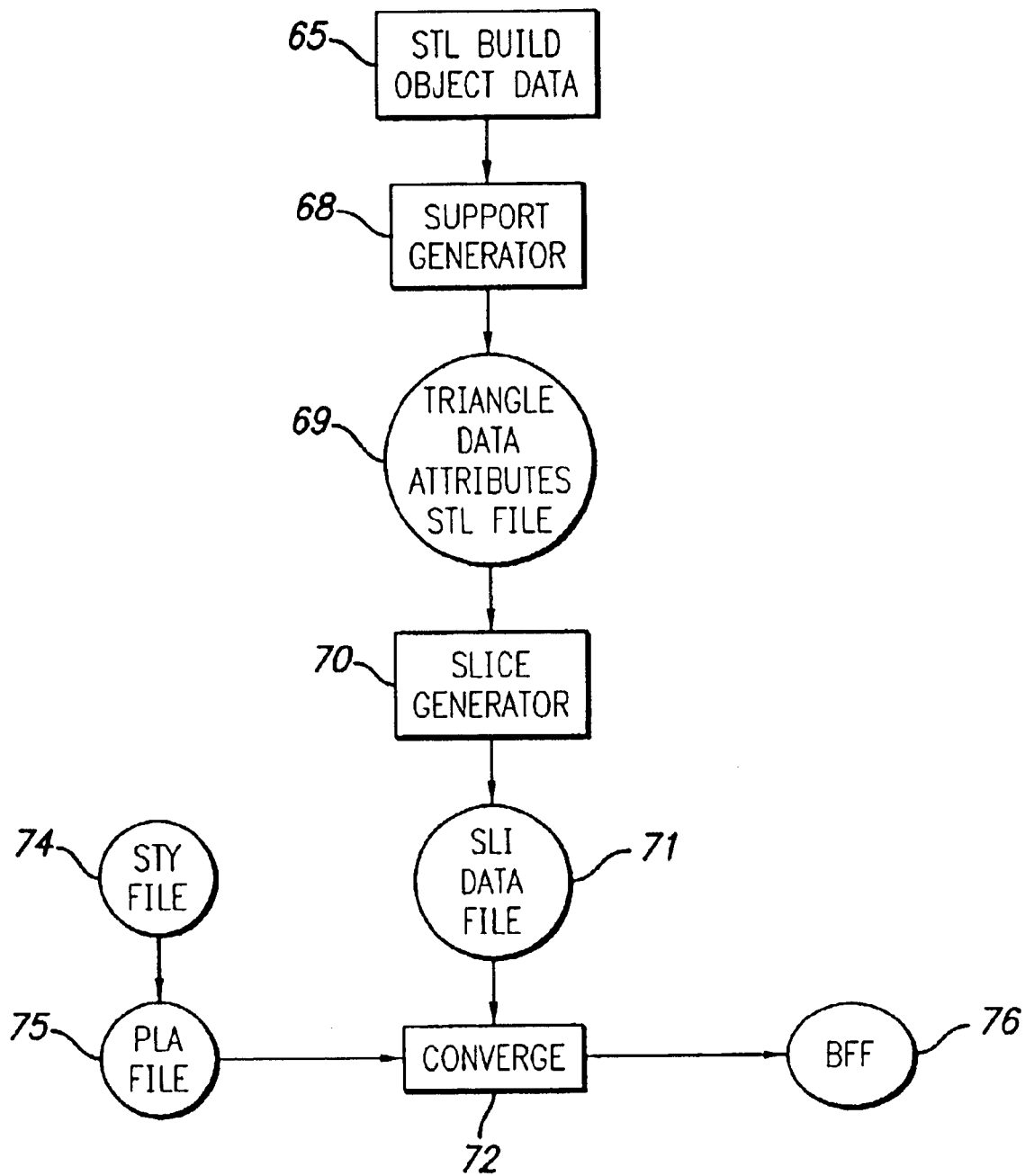
FIG. 10 is a data flow diagram depicting the creation and flow of data to create support structure by the method of the present invention.

As can be seen in FIG. 10, the software creates the build object data STL file 65 and the support generator 68 generates the support structure. STL file 65 clearly identifies the interfacing triangles from the non-interfacing triangles. This information is stored in the 2 byte attribute field that is present for each triangle in the STL triangle attribute file 69.

For example, the attribute field can be equated to (0) for non-interfacing triangles, (1) for up-interfacing triangles, and (2) for down-interfacing triangles.

This data is then fed to the Slice Generator 70 to create the SLI file that is generated from the series of closely-spaced horizontal planes being mathematically passed through the tessellated object file. The Slice Generator 70 slices the support file, taking into consideration the different types of triangles. It then generates vectors for the triangles. Vectors that are generated from non-interfacing triangles are identified as support boundaries (SB) and vectors generated for the up-interfacing triangles are identified as support up-facing interfacing boundaries (SUIB). Vectors generated for the down-interfacing triangles are identified as support down-facing interfacing boundaries (SDIB). The build style file (STY) 74 has different cure depths for each of these three vector types. The SUIB and the SDIB are assigned cure depths less than the cure depth of the SB to make the interface layers weaker than the rest of the support structure 11. This results in support structure that is easier to remove from the part and also causes less damage to the surface to which the support structure is attached.

The support build styles from the build style file 74 is fed to the platform file (PLA) 75 which is unique for the particular stereolithography system being employed to make the part 11. The data is then fed to the converged module 72 which merges the SLI data file, the style file 74 and PLA file 75 information to create the build file (BFF) 76. The build file 76, having received the multiple SLI files and merged them, now begins the process of generating the actual physical object using the stereolithography system with its fluid medium or photopolymer chemical.

Any suitable fluid medium capable of solidification in response to the application of an appropriate form of energy stimulation may be employed in the practice of the present invention. Many liquid state chemicals are known which can be induced to change to solid state polymer plastic by irradiation with ultraviolet light or other forms of stimulation such as electron beams, visible or invisible light, or reactive chemicals applied by ink jet or via a suitable mask. Suitable photopolymers that may be employed in the practice of the present invention include any commercially available photopolymer manufactured by Ciba Specialty Chemicals of Los Angeles, Calif., and sold by 3D Systems, Inc. of Valencia, Calif. These include, but are not limited to, SL 7540, SL 5170, SL 5180, SL 5195, and SL 5510 for use in any 3D Systems' commercially available SLA™ system.

Figure 2:
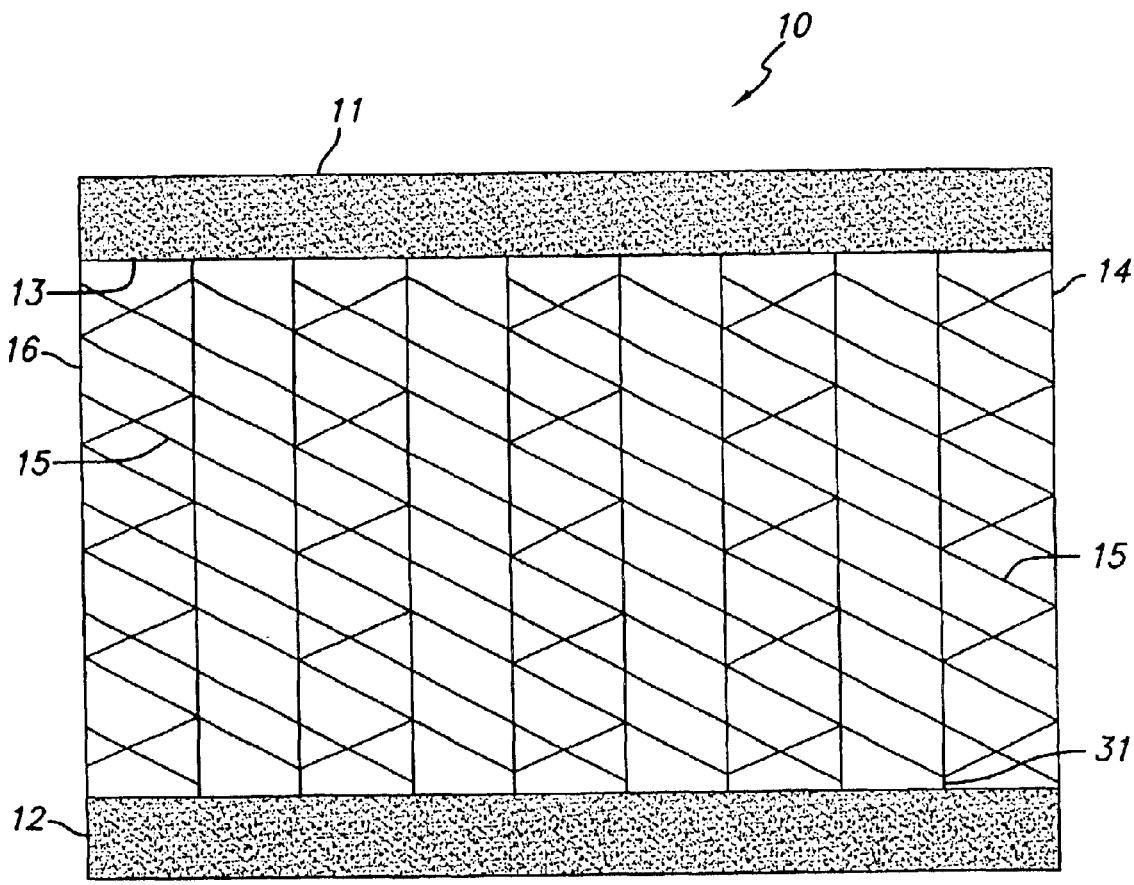
FIG. 2 is a diagrammatic illustration of the support structure of the present invention in contact with a three-dimensional part being generated.

The present invention can be practiced on any stereolithographic equipment, but shall be discussed in the context of an SLA™ 7000 system available commercially from 3D Systems, Inc., the assignee of the present invention. As shown in FIG. 2, a diagrammatic illustration of a support structure indicated generally by the numeral 10 is shown. The three-dimensional object or part being formed is indicated by the numeral 11 and the up-facing region of the part 11 is indicated by the numeral 12. The up-facing region 12 could equally well be the elevator platform supporting the part 11. Part 11 has a down-facing region 13 to which are attached strands, two of which are indicated by numerals 14 and 16. Strands are connected by projections 15 across the entire support structure 10. Adjacent strands 14 and 31 are shown connected by projections 15 and will be discussed later in conjunction with adjacent strands.

Figure 3:
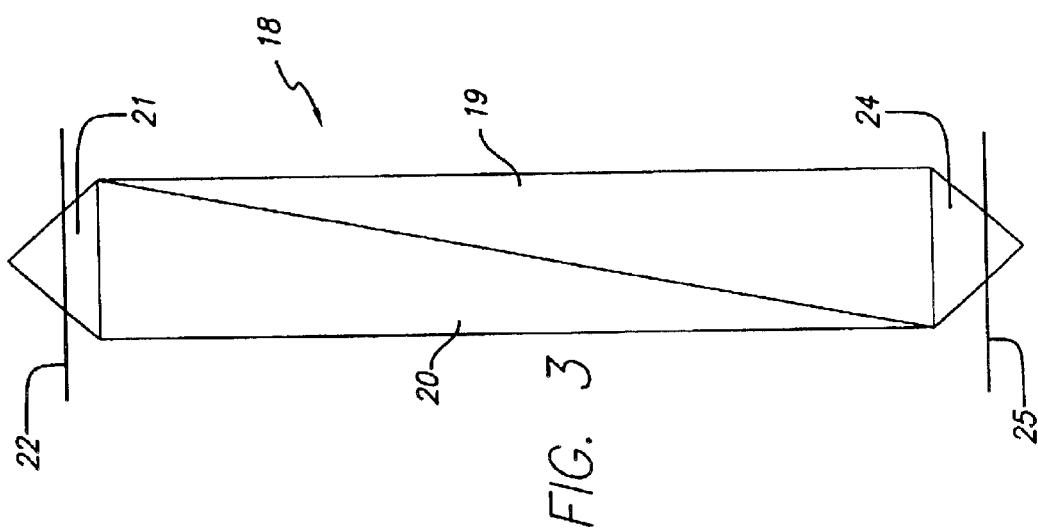
FIG. 3 is a side elevational view of the interfacing side of a single strand that forms a portion of the support structure showing the triangulation graphic pattern employed by the computer in creating the stereolithographic part using the graphic data and showing the areas of contact or interface between the support structure and the part.

FIG. 3 shows the interfacing side indicated generally by the numeral 18 of strand 14. Side 18 is formed by the graphical pattern created by the programming computer 4 that is used to generate a first triangle 19 and a second triangle 20 that comprise the intermediate region of interfacing side 18 of strand 14, as will be explained. Triangles 19 and 20 have a greater cure depth than the portions of side 18 contacting part 11. Two additional triangles 21 and 24 are generated at opposing ends of side 18 by the support generator 68 (see briefly FIG. 10). Triangle 21 is an upper interface triangle which interfaces or contacts the support up-facing surface 22 of the part 11 being generated. Lower interface triangle 24 contacts with the support down-facing surface 25 of the part 11. As explained previously, lower interface triangle 24 could also be interfacing with the elevator platform (not shown) of the SLA™ system. Interfacing triangles 21 and 24 are cured to a lesser depth than the triangles 19 and 20 that comprise the intermediate region of interfacing side 18. Slicing triangles 21 and 24 generate support up-facing interface boundary (SUIB) and support down-facing interface boundary (SDIB), respectively. The SLI or SLICE generator 70 of FIG. 10 mathematically passes a series of closely spaced horizontal planes through the tessellated object file. The SLI file represents a series of closely spaced two-dimensional cross-sections of the three-dimensional object, each at a slightly different Z-coordinate value.

Figure 5:
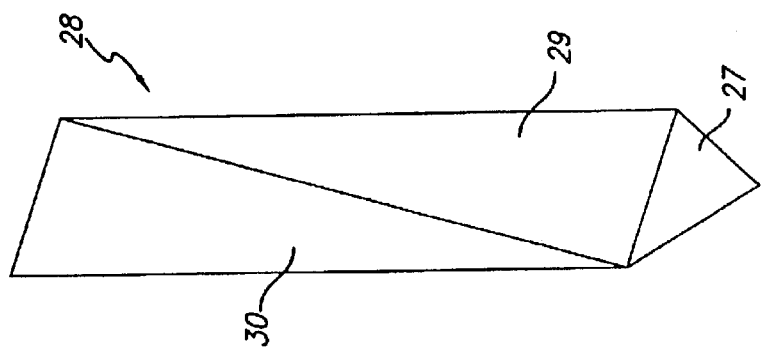
FIG. 5 is a side elevational view of the second part of the single strand of FIG. 4 showing the triangulation of the second part.
Figure 4:
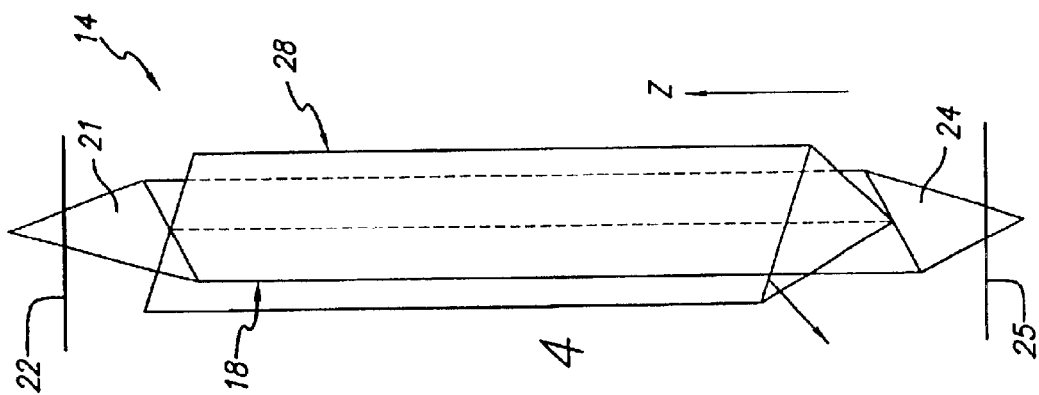
FIG. 4 is a perspective view of a single strand formed from two parts, one of which is shown in FIG. 3.

FIG. 5 shows the non-interfacing side indicated generally by the numeral 28 that combines with interfacing side 18 to form the strand 14, see briefly FIG. 4. As seen in FIG. 5, there is a triangulation graphical pattern also formed by the computer 4 to create a first triangle 29 and a second triangle 30 in the side 28. Side 28 also has a third triangle 27 that points downward to avoid down-facing areas on the strand 14 itself, but which does not contact the part 11. Side 28 adds rigidity to side 18 of strand 14 and is cured to a depth greater than the cure depth of interfacing triangles 21 and 24.

FIG. 4 then shows the assembled strand 14 with interfacing side 18 and non-interfacing side 28 assembled so as to form orthogonally intersecting sides. Strand 14 interfaces with the part 11 along the lower and upper interfacing surfaces 22 and 25, respectively. It should be noted that only the interfacing side 18 has the interfacing triangles 21 and 24 contact the part along the part interface surfaces 22 and 25. The purpose of the strands with their interfacing sides is to provide support to the part 11 while the part is being built. The strands, such as strands 14, 16, and 31 illustrated in FIG. 2, are always vertically oriented. The individual strands are made up of several components formed from triangles, as earlier explained with respect to sides 18 and 28 of FIGS. 3 and 5, respectively.

There are parameters associated with strands 14 and 31 that can be modified to change the size of the strand as appropriate. The orthogonal orientation of the interfacing and non-interfacing sides provides the required amount of rigidity and self-support to the part so that each strand has sufficient rigidity to resist the pressure of a recoating blade (not shown) which could be used to apply additional layers of photopolymer liquid to the part 11 during generation. Yet the differential curing of the support structure 10 ensures that the interfacing triangles 21, 36, 24 and 39, seen in FIG. 6, have a lesser cure depth than the intermediate regions of strands 14 and 34 and the orthogonal sides 18, 28, 32 and 34 to create weak points at the interface with the part 11 along the interfacing surfaces 22 and 24 to easily remove the support structure 10 from the finished part 11.

Figure 6:
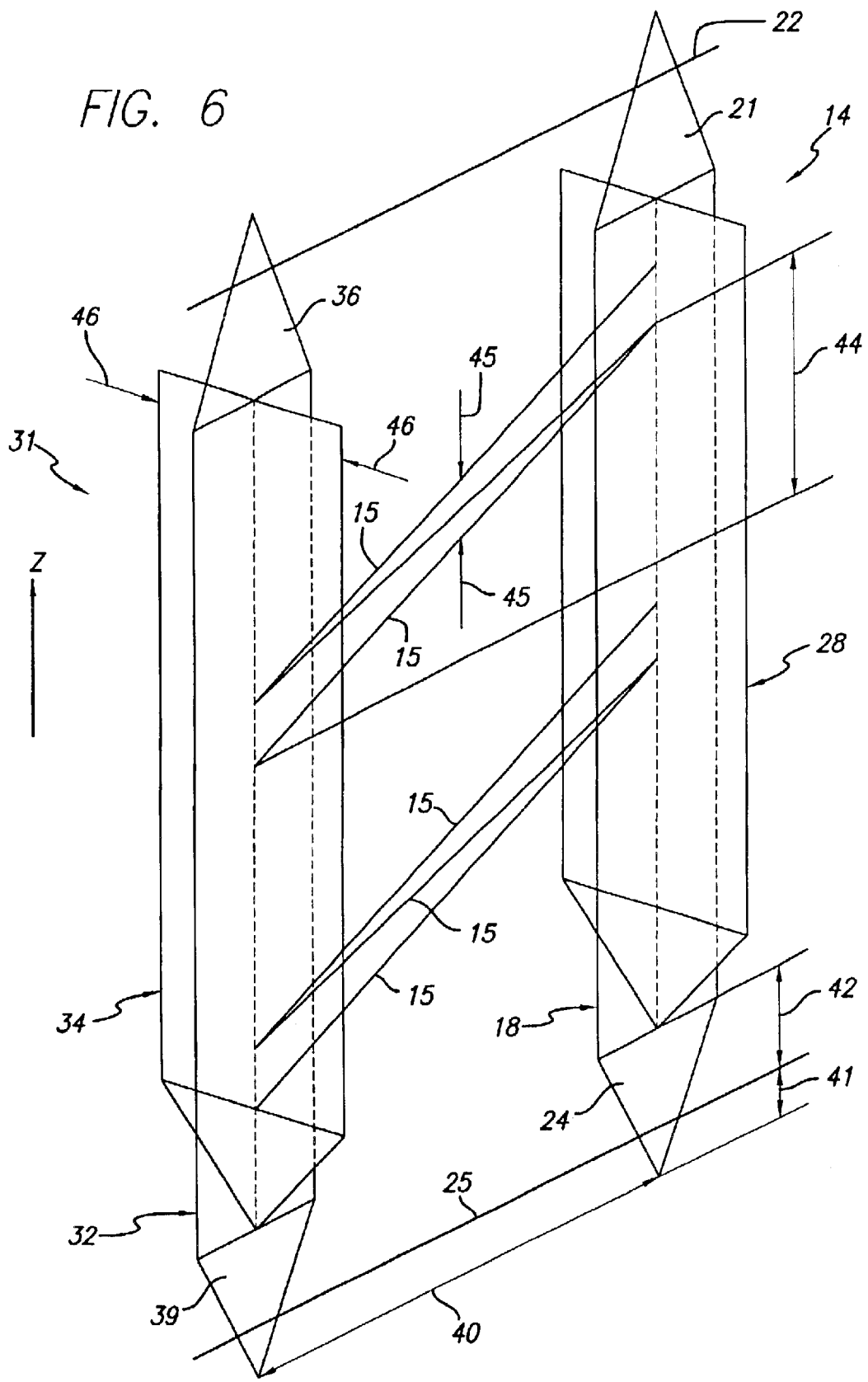
FIG. 6 is a perspective view of two strands of FIG. 2 connected by projections showing some key parameters used to generate the support structure of the present invention.

As best seen in FIG. 6, projections 15 originate from one strand and project onto an adjacent strand. Projections 15 extend from strand 31 to strand 14. Projections can be either in an upward or a downward direction. None of the projections ever touch the part 11 and are all formed of non-interfacing triangles. Alternatively, the projection could be formed from a different geometric form, such as rectangles which would also be orthogonally oriented. Such a design can make the projections more rigid, should such rigidity be required.

Returning to FIG. 6, it can be seen that the two strands 14 and 31 have similar structure. Strand 31, for instance, has a non-interfacing side 34 and an interfacing side 32. Interfacing side 32 has the upper interface triangle 36 and the lower interface triangle 39. The key parameters associated with the support structure of the present invention are shown in FIG. 6. These parameters define the critical distances and dimensions of the strands, projections and, where employed, triangular braces. These parameters include the strand spacing 40 which is the distance between strands 14 and 31, in this instance. The interface intersect height 41 is the height of the vertical portion of the lower interface triangles 24 and 39 that actually penetrates the part 11 (not shown). This height can be the same or different for the lower- and upper-facing triangle 5. The interface exposed height 42 is the height of the vertical portion of the interface triangle that does not penetrate the part 11. The same height can be used for the upper and lower interface triangles 21, 36, and 24, 39, respectively, or different heights can be employed as desired. The projection offset height 44 represents the difference in height or vertical distance between the starting point of the projection 15 and the ending point of the projection as the projection extends between adjacent strands. The projection thickness is shown by the distance between the projection thickness arrows 45. Similarly, the strand thickness is shown by the distance between the strand thickness arrows 46. The strand thickness is the actual thickness or width of either the interfacing sides 32, 18 or the non-interfacing sides 34, 28.

By way of example and to illustrate the differential curing used in the present invention to create weak points in the support structure 10 of the interface with part 11, the upper interface triangle 21 and the lower interface triangle 24 that generate the SDIB and the SUIB, respectively, after slicing can have cure depths of about 9 mils. The strand interfacing side 18 and the non-interfacing side 24 can have a cure depth of about 12 mils, depending upon the particular resin used. Generally, the cure depth of upper and lower interface triangles 21 and 24 at the SUIB and the SDIB will be 2 to 3 mils thinner than the rest of the support structure 10. The part 11 cure depth thickness can be any desired thickness, for example, ranging from about 1 to about 10 mils or greater thickness. The thickness of the cure depth of the part 11 relative to the cure depth thickness of the supports has been found to be immaterial relative to creating weak points because of the increased strength of the part from the successively superimposed layers.

Figure 7:
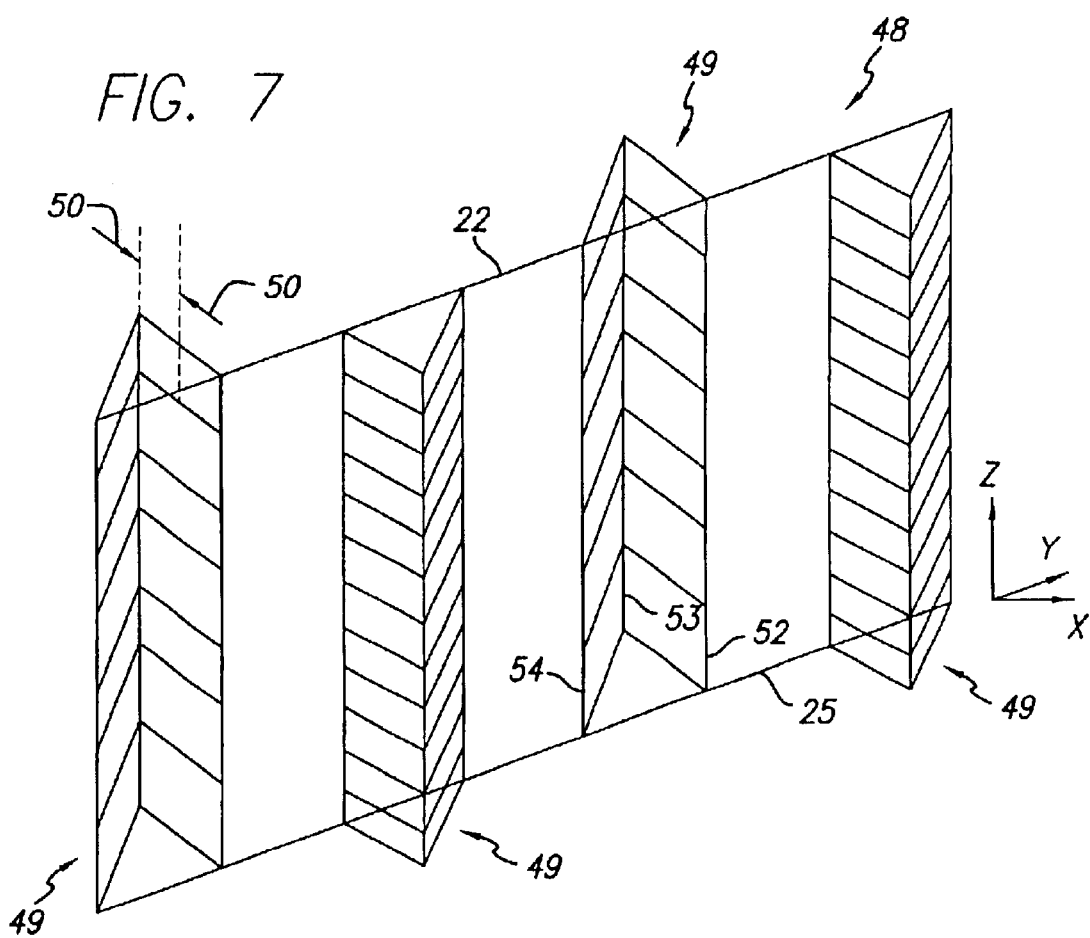
FIG. 7 is a diagrammatic illustration of triangular braces that are used to reinforce the entire strand-projection network in a part.

Another support entity, called a triangular brace, is shown in FIG. 7 and is utilized in addition to the basic support structure that consists of strands and projections. Numeral 48 indicates generally the main strand projection structure having triangular braces 49. The main strands are shown by the numerals 52, 53 and 54. This triangular brace structure is employed as the part build progresses and the height of the strand-projection framework increases. This framework can begin to sway as the recoating blade (not shown) utilized in an SLA™ system applies new photopolymer to the part in the photopolymer vat (also not shown). Such swaying is precarious for the stability of the supports and the part 11. Therefore, the strand-projection framework needs to be braced so it will remain stable during the entire build process. The triangular braces 49 serve this purpose. Each triangular brace is made of three strands with several projections between each. The three strands 52, 53 and 54, respectively, form the triangular shape in the X-Y plane. Two of the end strands are attached to the main support strand in order to form one cohesive unit with the main support structure. Triangular offset width, indicated by the triangular offset width arrows 50 in FIG. 7, represents the distance of the outermost vertical strand of the triangular brace from the actual support structure. If this distance is increased sufficiently, there may be several strands on the brace between the support structure and the uppermost strand. It should be noted, with respect to all of the key parameters previously discussed, that the software being employed can change the values of the parameters from those used in a style to create better supports and this can occur under a dynamic modification of the parameters.

Figure 8:
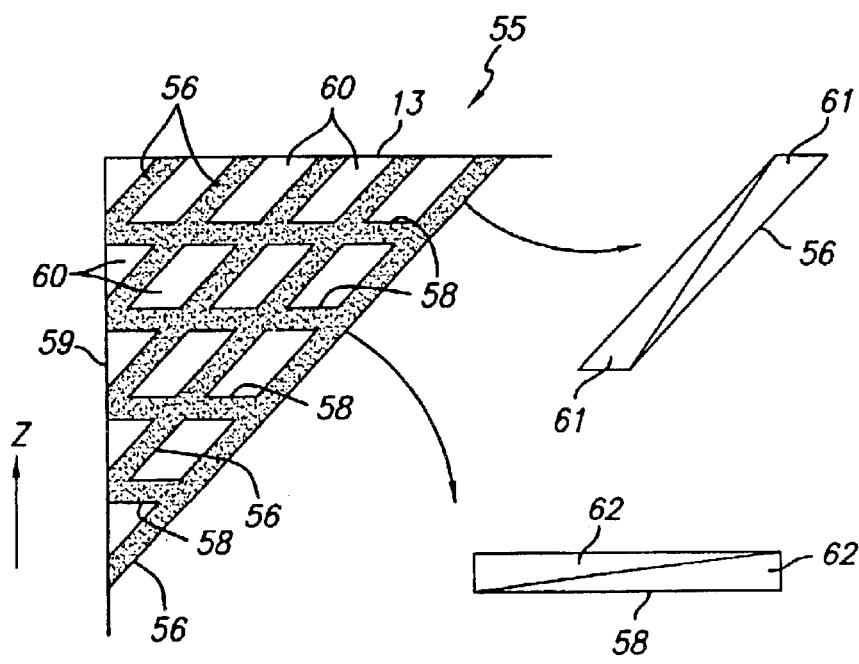
FIG. 8 is a diagrammatic illustration of support gussets that are used as a support structure to reinforce a part having a vertical area adjacent to a down-facing area.

Still another form of support structure that may be employed is the gusset, indicated generally by the numeral 55 in FIG. 8. The gusset 55 is employed on a part with down-facing surfaces that have vertical areas adjacent to them. The gusset 55 is formed from angular strips 56 of triangles 61 and horizontal strips 58 of triangles 62. The horizontal strips 58 support the angular strips 56 as the gusset 55 is being built in the Z direction. Together the angular strips 56 and the horizontal strips 58 form a cohesive unit, the gusset 55, which supports the down-facing area 13 of the part. Spaces 60 between the angular strips 56 and the horizontal strips 58 permit the photopolymer material to easily drain out and precludes trapping liquid volumes in the part being generated.

The triangles 61 and 62 of gusset 55 shown in FIG. 8 are generated in the same manner as the strand triangles 19, 20, 29 and 30 discussed earlier with reference to FIGS. 3 and 5. Each angular strip 56 and horizontal strip 58 is formed from two triangles as shown. The number of strips employed in each gusset 55 is dependent upon the size of the down-facing area and the gusset angle chosen. A gusset default angle of 45 degrees is employed unless overridden by the stereolithographic system operator. The thickness of the projections between adjacent gussets 55 is determined in the same manner as the projection thickness 45 discussed previously with respect to FIG. 6. It should be noted that all of the triangles 61 and 62 of angular strips 56 and 58, respectively, are interfacing triangles and therefore are easier to remove from the part being generated.

While the invention has been described above with references to specific embodiments thereof, it is apparent that many changes, modifications and variations in the materials, arrangements of parts and steps can be made without departing from the inventive concept disclosed herein. For example, in employing the method of the present invention to form support structure, the method can equally well be applied to create supports for parts using the QuickCast™ build style for direct shell investment casting. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A stereolithographic part formed by selective stimulation of a liquid medium to a solid state comprising:
   (a) at least one support structure with an intermediate region connecting opposing interfacing regions, the interfacing regions contacting the part at interfacing boundaries;

(b) the intermediate region having a first solid cure depth; and (c) the interfacing regions having a second solid cure depth, the second solid cure depth being sufficiently less than the first solid cure depth to create weak points where the support structure is easily separable from the part.

2. The part according to claim 1 wherein the interfacing regions further comprise up-facing interfacing regions and down-facing interfacing regions.

3. The part according to claim 2 wherein the part has a third solid cure depth greater than the second solid cure depth.

4. The part according to claim 3 wherein the support structure further comprises vertically oriented strands.

5. The part according to claim 4 wherein the strands each have the opposing interfacing regions connected to an object interfacing side.

6. The part according to claim 5 wherein the strands each have an object non-interfacing side orthogonally intersecting the object interfacing side.

7. The part according to claim 6 wherein adjacent vertically oriented strands are connected and reinforced with at least one projection extending therebetween.

8. The part according to claim 5 wherein the object non-interfacing side and the object intersecting side are graphically patterned triangles.

9. The part according to claim 2 wherein the support structure is reinforced with triangular braces.

10. The part according to claim 1 wherein the support structure to reinforce the part includes gussets.

11. The part according to claim 10 wherein the gussets are formed from horizontal strips and angular strips connected to the part, the strips being separated by spaces to facilitate drainage of the liquid medium during part generation.

* * * * *